(12) United States Patent
Ikemoto

(10) Patent No.: US 7,857,230 B2
(45) Date of Patent: Dec. 28, 2010

(54) WIRELESS IC DEVICE AND MANUFACTURING METHOD THEREOF

(75) Inventor: Nobuo Ikemoto, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/579,672

(22) Filed: Oct. 15, 2009

(65) Prior Publication Data

US 2010/0038433 A1 Feb. 18, 2010

Related U.S. Application Data

(63) Continuation of application No. PCT/JP2008/062884, filed on Jul. 17, 2008.

(30) Foreign Application Priority Data

Jul. 18, 2007 (JP) ............... 2007-187436

(51) Int. Cl.
 *G06K 19/06* (2006.01)
(52) U.S. Cl. .................. 235/492; 235/380; 235/451
(58) Field of Classification Search .............. 235/492, 235/380, 441, 451; 340/572.1
See application file for complete search history.

(56) References Cited

U.S. PATENT DOCUMENTS

| | | | |
|---|---|---|---|
| 3,364,564 A | 1/1968 | Kurtz et al. | |
| 4,794,397 A | 12/1988 | Ohe et al. | |
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,528,222 A | 6/1996 | Moskowitz et al. | |
| 5,757,074 A | 5/1998 | Matloubian et al. | |
| 5,854,480 A | 12/1998 | Noto | |
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |

(Continued)

FOREIGN PATENT DOCUMENTS

DE  10 2006 057 412 A1  6/2007

(Continued)

OTHER PUBLICATIONS

Official communication issued in Japanese Application No. 2007-531524, mailed on Sep. 11, 2007.

(Continued)

*Primary Examiner*—Edwyn Labaze
(74) *Attorney, Agent, or Firm*—Keating & Bennett, LLP

(57) ABSTRACT

An electromagnetic coupling module includes a feed circuit substrate having external coupling electrodes on both main surfaces thereof and a wireless IC chip. Radiation electrodes are disposed on a packaging body. The electromagnetic coupling module is disposed on a joint of the packaging body so that the external coupling electrodes on both the main surfaces of the electromagnetic coupling module are coupled to the radiation electrodes, respectively. Thus, the wireless IC device is resistant to shock, stress, forces or the like, easy to manufacture, obtains stable characteristics and allows for easy reuse or replacement of an IC chip.

14 Claims, 7 Drawing Sheets

U.S. PATENT DOCUMENTS

| | | |
|---|---|---|
| 6,104,311 A | 8/2000 | Lastinger |
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,249,258 B1 | 6/2001 | Bloch et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,812,707 B2 | 11/2004 | Yonezawa et al. |
| 6,828,881 B2 | 12/2004 | Mizutani et al. |
| 6,837,438 B1 | 1/2005 | Takasugi et al. |
| 6,927,738 B2 | 8/2005 | Senba et al. |
| 6,963,729 B2 | 11/2005 | Uozumi |
| 7,088,249 B2 | 8/2006 | Senba et al. |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 2002/0011967 A1 | 1/2002 | Goff et al. |
| 2002/0015002 A1 | 2/2002 | Yasukawa et al. |
| 2002/0044092 A1 | 4/2002 | Kushihi |
| 2002/0067316 A1 | 6/2002 | Yokoshima et al. |
| 2003/0006901 A1 | 1/2003 | Kim et al. |
| 2003/0020661 A1 | 1/2003 | Sato |
| 2003/0169153 A1 | 9/2003 | Muller |
| 2004/0001027 A1 | 1/2004 | Killen et al. |
| 2004/0026519 A1 | 2/2004 | Usami et al. |
| 2004/0056823 A1 | 3/2004 | Zuk et al. |
| 2004/0066617 A1 | 4/2004 | Hirabayashi et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0134460 A1 | 6/2005 | Usami |
| 2005/0138798 A1 | 6/2005 | Sakama et al. |
| 2005/0140512 A1 | 6/2005 | Sakama et al. |
| 2005/0232412 A1 | 10/2005 | Ichihara et al. |
| 2005/0236623 A1 | 10/2005 | Takechi et al. |
| 2005/0275539 A1 | 12/2005 | Sakama et al. |
| 2006/0001138 A1 | 1/2006 | Sakama et al. |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0214801 A1 | 9/2006 | Murofushi et al. |
| 2006/0220871 A1 | 10/2006 | Baba et al. |
| 2006/0267138 A1 | 11/2006 | Kobayashi |
| 2007/0004028 A1 | 1/2007 | Lair et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0069237 A1 | 3/2007 | Lin et al. |
| 2007/0132591 A1 | 6/2007 | Khatri |
| 2007/0164414 A1 | 7/2007 | Dokai et al. |
| 2007/0252700 A1 | 11/2007 | Ishihara et al. |
| 2007/0252703 A1 | 11/2007 | Kato et al. |
| 2007/0285335 A1 | 12/2007 | Bungo et al. |
| 2008/0024156 A1 | 1/2008 | Arai et al. |
| 2008/0087990 A1 | 4/2008 | Kato et al. |
| 2008/0143630 A1 | 6/2008 | Kato et al. |
| 2008/0169905 A1 | 7/2008 | Slatter |
| 2008/0272885 A1 | 11/2008 | Atherton |
| 2009/0002130 A1 | 1/2009 | Kato |
| 2009/0009007 A1 | 1/2009 | Kato et al. |
| 2009/0065594 A1 | 3/2009 | Kato et al. |

FOREIGN PATENT DOCUMENTS

| | | |
|---|---|---|
| DE | 10 2006 057 369 A1 | 6/2008 |
| EP | 0 694 874 A2 | 1/1996 |
| EP | 0 861 788 A1 | 9/1998 |
| EP | 0 977 145 A2 | 2/2000 |
| EP | 1 010 543 A1 | 6/2000 |
| EP | 1 160 915 A2 | 12/2001 |
| EP | 1 170 795 A2 | 1/2002 |
| EP | 1 280 232 A1 | 1/2003 |
| EP | 1 343 223 A1 | 9/2003 |
| EP | 1 357 511 A2 | 10/2003 |
| EP | 1 538 560 A2 | 6/2005 |
| EP | 1 715 445 A1 | 10/2006 |
| EP | 1 724 714 A2 | 11/2006 |
| JP | 50-143451 A | 11/1975 |
| JP | 62-127140 U | 8/1987 |
| JP | 02-164105 A | 6/1990 |
| JP | 03-262313 A | 11/1991 |
| JP | 04-150011 A | 5/1992 |
| JP | 04-167500 A | 6/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 07-183836 A | 7/1995 |
| JP | 08-056113 A | 2/1996 |
| JP | 8-87580 A | 4/1996 |
| JP | 08-088586 A | 4/1996 |
| JP | 11-149537 A | 6/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 09-245381 A | 9/1997 |
| JP | 09-252217 A | 9/1997 |
| JP | 09-270623 A | 10/1997 |
| JP | 9-512367 A | 12/1997 |
| JP | 10-069533 A | 3/1998 |
| JP | 10-505466 A | 5/1998 |
| JP | 10-171954 A | 6/1998 |
| JP | 10-193849 A | 7/1998 |
| JP | 10-293828 A | 11/1998 |
| JP | 11-039441 A | 2/1999 |
| JP | 11-075329 A | 3/1999 |
| JP | 11-085937 A | 3/1999 |
| JP | 11-102424 A | 4/1999 |
| JP | 11-103209 A | 4/1999 |
| JP | 11-149536 A | 6/1999 |
| JP | 11-149538 A | 6/1999 |
| JP | 11-219420 A | 8/1999 |
| JP | 11-220319 A | 8/1999 |
| JP | 11-328352 A | 11/1999 |
| JP | 11-346114 A | 12/1999 |

| | | | | | | |
|---|---|---|---|---|---|---|
| JP | 11-515094 A | 12/1999 | | JP | 2003-030612 A | 1/2003 |
| JP | 2000-21128 A | 1/2000 | | JP | 2003-44789 A | 2/2003 |
| JP | 2000-021639 A | 1/2000 | | JP | 2003-58840 A | 2/2003 |
| JP | 2000-022421 A | 1/2000 | | JP | 2003-067711 A | 3/2003 |
| JP | 2005-229474 A | 1/2000 | | JP | 2003-069335 A | 3/2003 |
| JP | 2000-059260 A | 2/2000 | | JP | 2003-076947 A | 3/2003 |
| JP | 2003-046318 A | 2/2000 | | JP | 2003-078336 A | 3/2003 |
| JP | 2000-085283 A | 3/2000 | | JP | 2003-085501 A | 3/2003 |
| JP | 2000-090207 A | 3/2000 | | JP | 2003-085520 A | 3/2003 |
| JP | 2000-132643 A | 5/2000 | | JP | 2003-87008 A | 3/2003 |
| JP | 2000-137778 A | 5/2000 | | JP | 2003-87044 A | 3/2003 |
| JP | 2000-137779 A | 5/2000 | | JP | 2003-099720 A | 4/2003 |
| JP | 2000-137785 A | 5/2000 | | JP | 2003-099721 A | 4/2003 |
| JP | 2000-148948 A | 5/2000 | | JP | 2003-110344 A | 4/2003 |
| JP | 2000-172812 A | 6/2000 | | JP | 2003-132330 A | 5/2003 |
| JP | 2000-222540 A | 8/2000 | | JP | 2003-134007 A | 5/2003 |
| JP | 2000-510271 A | 8/2000 | | JP | 2003-155062 A | 5/2003 |
| JP | 2000-243797 A | 9/2000 | | JP | 2003-158414 A | 5/2003 |
| JP | 2000-251049 A | 9/2000 | | JP | 2003-187207 A | 7/2003 |
| JP | 2000-276569 A | 10/2000 | | JP | 2003-187211 A | 7/2003 |
| JP | 2000-286634 A | 10/2000 | | JP | 2003-188338 A | 7/2003 |
| JP | 2000-286760 A | 10/2000 | | JP | 2003-198230 A | 7/2003 |
| JP | 2000-311226 A | 11/2000 | | JP | 2003-209421 A | 7/2003 |
| JP | 2000-321984 A | 11/2000 | | JP | 2003-216919 A | 7/2003 |
| JP | 3075400 U | 11/2000 | | JP | 2003-218624 A | 7/2003 |
| JP | 2000-349680 A | 12/2000 | | JP | 2003-233780 A | 8/2003 |
| JP | 2001-028036 A | 1/2001 | | JP | 2003-242471 A | 8/2003 |
| JP | 2007-18067 A | 1/2001 | | JP | 2003-243918 A | 8/2003 |
| JP | 2001-043340 A | 2/2001 | | JP | 2003-249813 A | 9/2003 |
| JP | 2001-66990 A | 3/2001 | | JP | 2003-529163 A | 9/2003 |
| JP | 2001-505682 A | 4/2001 | | JP | 2003-288560 A | 10/2003 |
| JP | 2001-168628 A | 6/2001 | | JP | 2003-309418 A | 10/2003 |
| JP | 2001-188890 A | 7/2001 | | JP | 2003-317060 A | 11/2003 |
| JP | 2001-240046 A | 9/2001 | | JP | 2003-331246 A | 11/2003 |
| JP | 2001-256457 A | 9/2001 | | JP | 2003-332820 A | 11/2003 |
| JP | 2001-514777 A | 9/2001 | | JP | 2004-040597 A | 2/2004 |
| JP | 2001-319380 A | 11/2001 | | JP | 2004-505481 A | 2/2004 |
| JP | 2001-331976 A | 11/2001 | | JP | 2004-082775 A | 3/2004 |
| JP | 2001-332923 A | 11/2001 | | JP | 2004-88218 A | 3/2004 |
| JP | 2001-344574 A | 12/2001 | | JP | 2004-096566 A | 3/2004 |
| JP | 2001-351084 A | 12/2001 | | JP | 2004-127230 A | 4/2004 |
| JP | 2001-352176 A | 12/2001 | | JP | 2004-253858 A | 9/2004 |
| JP | 2002-024776 A | 1/2002 | | JP | 2004-280390 A | 10/2004 |
| JP | 2002-026513 A | 1/2002 | | JP | 2004-287767 A | 10/2004 |
| JP | 2002-042076 A | 2/2002 | | JP | 2004-297249 A | 10/2004 |
| JP | 2002-063557 A | 2/2002 | | JP | 2004-297681 A | 10/2004 |
| JP | 2002-505645 A | 2/2002 | | JP | 2004-319848 A | 11/2004 |
| JP | 2002-76750 A | 3/2002 | | JP | 2004-326380 A | 11/2004 |
| JP | 2002-076750 A | 3/2002 | | JP | 2004-334268 A | 11/2004 |
| JP | 2002-150245 A | 5/2002 | | JP | 2004-336250 A | 11/2004 |
| JP | 2002-157564 A | 5/2002 | | JP | 2004-343000 A | 12/2004 |
| JP | 2002-158529 A | 5/2002 | | JP | 2004-362190 A | 12/2004 |
| JP | 2002-175508 A | 6/2002 | | JP | 2004-362341 A | 12/2004 |
| JP | 2002-183690 A | 6/2002 | | JP | 2004-362602 A | 12/2004 |
| JP | 2002-185358 A | 6/2002 | | JP | 2005-18156 A | 1/2005 |
| JP | 2002-204117 A | 7/2002 | | JP | 2005-124061 A | 5/2005 |
| JP | 2002-522849 A | 7/2002 | | JP | 2005-129019 A | 5/2005 |
| JP | 2002-230128 A | 8/2002 | | JP | 2005-136528 A | 5/2005 |
| JP | 2002-252117 A | 9/2002 | | JP | 2005-137032 A | 5/2005 |
| JP | 2002-259934 A | 9/2002 | | JP | 3653099 B2 | 5/2005 |
| JP | 2004-527864 A | 9/2002 | | JP | 2005-165839 A | 6/2005 |
| JP | 2002-298109 A | 10/2002 | | JP | 2005-167327 A | 6/2005 |
| JP | 2002-308437 A | 10/2002 | | JP | 2005-167813 A | 6/2005 |
| JP | 2002-319008 A | 10/2002 | | JP | 2005-190417 A | 7/2005 |
| JP | 2002-319009 A | 10/2002 | | JP | 2005-191705 A | 7/2005 |
| JP | 2002-319812 A | 10/2002 | | JP | 2005-210676 A | 8/2005 |
| JP | 2002-362613 A | 12/2002 | | JP | 2005-210680 A | 8/2005 |
| JP | 2002-373029 A | 12/2002 | | JP | 2005-217822 A | 8/2005 |
| JP | 2002-373323 A | 12/2002 | | JP | 2005-236339 A | 9/2005 |
| JP | 2002-374139 A | 12/2002 | | JP | 2005-244778 A | 9/2005 |
| JP | 2003-006599 A | 1/2003 | | JP | 2005-275870 A | 10/2005 |
| JP | 2003-016412 A | 1/2003 | | JP | 2005-284352 A | 10/2005 |
| JP | 2003-026177 A | 1/2003 | | JP | 2005-293537 A | 10/2005 |

| | | | |
|---|---|---|---|
| JP | 2005-295135 A | 10/2005 | |
| JP | 2005-311205 A | 11/2005 | |
| JP | 2005-321305 A | 11/2005 | |
| JP | 2005-335755 A | 12/2005 | |
| JP | 2005-346820 A | 12/2005 | |
| JP | 2005-352858 A | 12/2005 | |
| JP | 2006-025390 A | 1/2006 | |
| JP | 2006-031766 A | 2/2006 | |
| JP | 2006-39902 A | 2/2006 | |
| JP | 2006-67479 A | 3/2006 | |
| JP | 2006-72706 A | 3/2006 | |
| JP | 2006-80367 A | 3/2006 | |
| JP | 2006-92630 A | 4/2006 | |
| JP | 2006-102953 A | 4/2006 | |
| JP | 2006-107296 A | 4/2006 | |
| JP | 2006-513594 A | 4/2006 | |
| JP | 2006-148518 A | 6/2006 | |
| JP | 2006-151402 A | 6/2006 | |
| JP | 2006-174151 A | 6/2006 | |
| JP | 2006-195795 A | 7/2006 | |
| JP | 2006-203187 A | 8/2006 | |
| JP | 2006-203852 A | 8/2006 | |
| JP | 2006-217000 A | 8/2006 | |
| JP | 2006-232292 A | 9/2006 | |
| JP | 2006-237674 A | 9/2006 | |
| JP | 2006-270212 A | 10/2006 | |
| JP | 2006-270766 A | 10/2006 | |
| JP | 2006-285911 A | 10/2006 | |
| JP | 2006-302219 A | 11/2006 | |
| JP | 2006-309401 A | 11/2006 | |
| JP | 2006-323481 A | 11/2006 | |
| JP | 2007-007888 A | 1/2007 | |
| JP | 2007-043535 A | 2/2007 | |
| JP | 2007-048126 A | 2/2007 | |
| JP | 2007-65822 A | 3/2007 | |
| JP | 2007-096768 A | 4/2007 | |
| JP | 2007-122542 A | 5/2007 | |
| JP | 2007-150868 A | 6/2007 | |
| JP | 2007-159129 A | 6/2007 | |
| JP | 4069958 B2 | 4/2008 | |
| JP | 2008-160874 A | 7/2008 | |
| JP | 11-175678 A | 1/2009 | |
| NL | 9100176 A | 3/1992 | |
| NL | 9100347 A | 3/1992 | |
| WO | 99/67754 A1 | 12/1999 | |
| WO | 00/10122 A2 | 2/2000 | |
| WO | 02/061674 A1 | 8/2002 | |
| WO | 02/097723 A1 | 12/2002 | |
| WO | 03/079305 A1 | 9/2003 | |
| WO | 2004/036772 A1 | 4/2004 | |
| WO | 2004/070879 A | 8/2004 | |
| WO | 2004/072892 A1 | 8/2004 | |
| WO | 2005/073937 A | 8/2005 | |
| WO | 2005/115849 A1 | 12/2005 | |
| WO | 2006/045682 A | 5/2006 | |
| WO | 2007/083574 A1 | 7/2007 | |
| WO | 2007/125683 A1 | 11/2007 | |
| WO | 2007/138857 A1 | 12/2007 | |

OTHER PUBLICATIONS

Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399, mailed on Aug. 25, 2008.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC device," U.S. Appl. No. 12/551,037, filed Aug. 31, 2009.
Official communication issued in International Application PCT/JP2008/062884, mailed on Oct. 21, 2008.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.

Kato et al.: "Wireless IC Device and Wireless IC Device Composite Component"; U.S. Appl. No. 12/276,444, filed Nov. 24, 2008.

Dokai et al.: "Optical Disc"; U.S. Appl. No. 12/326,916, filed Dec. 3, 2008.

Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.

Kato: "Wireless IC Device"; U.S. Appl. No. 11/964,185, filed Dec. 26, 2007.

Kato et al.: "Radio Frequency IC Device"; U.S. Appl. No. 12/336,629, filed Dec. 17, 2008.

Kato et al.: "Wireless IC Device and Component for Wireless IC Device"; U.S. Appl. No. 12/339,198, filed Dec. 19, 2008.

Ikemoto et al.: "Wireless IC Device"; U.S. Appl. No. 11/851,651, filed Sep. 7, 2007.

Kataya et al.: "Wireless IC Device and Electronic Device"; U.S. Appl. No. 11/851,661, filed Sep. 7, 2007.

Dokai et al.: "Antenna and Radio IC Device"; U.S. Appl. No. 12/350,307, filed Jan. 8, 2009.

Official Communication issued in International Application No. PCT/JP2007/066007, mailed on Nov. 27, 2007.

Dokai et al.: "Wireless IC Device and Component for Wireless IC Device"; U.S. Appl. No. 12/359,690, filed Jan. 26, 2009.

Dokai et al.: "Test System for Radio Frequency IC Devices and Method of Manufacturing Radio Frequency IC Devices Using the Same"; U.S. Appl. No. 12/388,826, filed Feb. 19, 2009.

Official Communication issued in International Application No. PCT/JP2008/061955, mailed on Sep. 30, 2008.

Official Communication issued in International Application No. PCT/JP2007/066721, mailed on Nov. 27, 2007.

Official Communication issued in International Application No. PCT/JP2007/070460, mailed on Dec. 11, 2007.

Kato et al.: "Wireless IC Device"; U.S. Appl. No. 12/390,556, filed Feb. 23, 2009.

Kato et al.: "Inductively Coupled Module and Item With Inductively Coupled Module"; U.S. Appl. No. 12/398,497, filed Mar. 5, 2009.

Official Communication issued in International Patent Application No. PCT/JP2008/050945, mailed on May 1, 2008.

Kato et al.: "Article Having Electromagnetic Coupling Module Attached Thereto"; U.S. Appl. No. 12/401,767, filed Mar. 11, 2009.

Taniguchi et al.: "Antenna Device and Radio Frequency IC Device"; U.S. Appl. No. 12/326,117, filed Dec. 2, 2008.

Official Communication issued in International Patent Application No. PCT/JP2008/061442, mailed on Jul. 22, 2008.

Kato et al.: "Container With Electromagnetic Coupling Module"; U.S. Appl. No. 12/426,369, filed Apr. 20, 2009.

Kato: "Wireless IC Device"; U.S. Appl. No. 12/429,346, filed Apr. 24, 2009.

Official Communication issued in corresponding European Patent Application No. 08778235.5, mailed on Jul. 23, 2010.

FIG. 10A
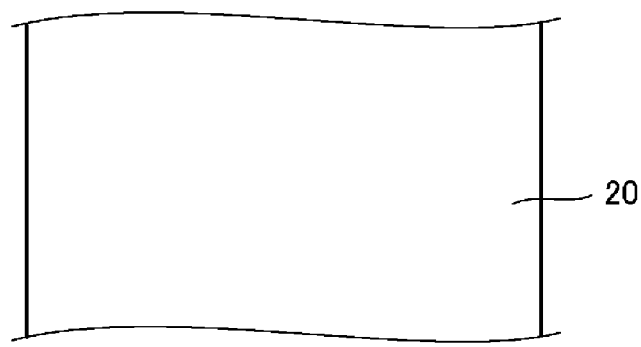
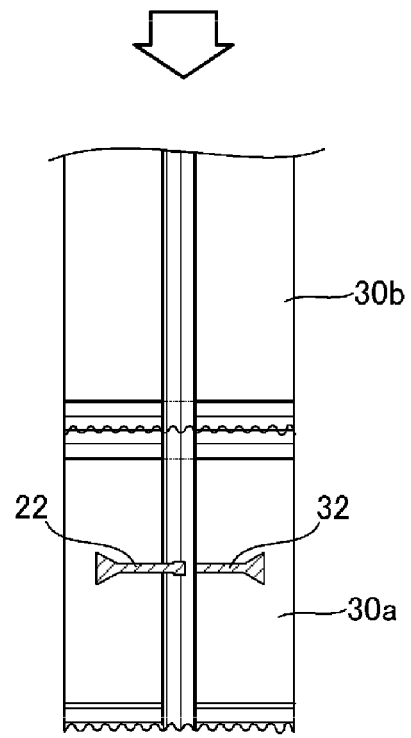
FIG. 10B
FIG. 10C
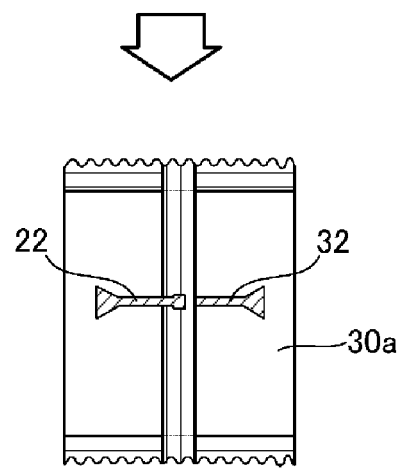

WIRELESS IC DEVICE AND MANUFACTURING METHOD THEREOF

BACKGROUND OF THE INVENTION

1. Field of the Invention

The present invention relates to a wireless IC device applied to an RFID (radio frequency identification) system where data communications are performed using electromagnetic waves in a contactless manner, and a manufacturing method thereof.

2. Description of the Related Art

In recent years, as article management systems, there have been used RFID systems in which a reader/writer, which generates an induction electromagnetic field, and an RFID tag, which is attached to an article and stores predetermined information, communicate with each other in a contactless manner so as to transmit information (see Japanese Unexamined Patent Application Publication No. 2005-244778).

FIG. 1 is a diagram showing an example of a contactless IC tag (RFID tag) where IC tag labels are mounted on IC tag antennas, shown in Japanese Unexamined Patent Application Publication No. 2005-244778.

An RFID tag TO is formed by forming a symmetrical pair of main antenna elements 81, an auxiliary antenna element 82, and a symmetrical pair of matching parts 83 on one surface of a dielectric substrate 84.

The main antenna elements 81 are meander-type antennas defined by meandering line conductors, and are disposed on the dielectric substrate 84 symmetrically. The main antenna elements 81 occupy both end areas of the dielectric substrate 84. The auxiliary antenna element 82 is disposed between the symmetrical pair of main antenna elements 81.

The matching parts 83 are defined by meandering line conductors. Ends of the matching parts 83 are connected to inner ends of the main antenna elements 81. A wireless IC chip 86 is mounted on the other ends of the matching parts 83.

However, the contactless IC tag of Japanese Unexamined Patent Application Publication No. 2005-244778 has the following problems.

Since the IC chip is mounted on the main antennas, it may be broken when shock, stress, forces or the like is applied to the main antennas.

Since the IC chip and main antennas (matching parts) must be disposed so as to be electrically coupled to each other, the main antennas have a small degree of flexibility in the disposition position. Also, the main antennas have a small degree of flexibility in designing radiation characteristics or directivity. Also, a high mounting accuracy is required and the manufacturing process is elongated. Therefore, the cost is increased.

Since the IC chip is connected to the main antennas using a conductive material, it is difficult to demount and then reuse the IC chip or replace it with another.

SUMMARY OF THE INVENTION

In view of the above problems, preferred embodiments of the present invention provide a wireless IC device that is resistant to shock stress, forces or the like, easy to manufacture, has stable characteristics, and allows for easy reuse or replacement of an IC chip thereof.

A wireless IC device according to a preferred embodiment of the present invention includes a wireless IC, a radiation plate including a radiation electrode on a base material, and a feed circuit substrate including an external coupling electrode and an inductance element, the external coupling electrode being electromagnetically coupled to the radiation electrode, the inductance element being coupled to the wireless IC. The radiation plate is preferably disposed along each of opposed first and second main surfaces of an electromagnetic coupling module including the wireless IC and the feed circuit substrate.

In one example, the feed circuit substrate preferably includes a resonant circuit.

In another example, the feed circuit substrate includes a matching circuit.

In addition, the external coupling electrode is preferably disposed near a main surface of the feed circuit substrate inside the feed circuit substrate and is a flat electrode capacitively coupled to the radiation electrode, for example.

The electromagnetic coupling module may preferably be disposed on a joint of ends of the radiation plate or a joint of a folded portion of the radiation plate, for example.

The electromagnetic coupling module disposed on the joint may preferably be detachable from the joint, for example.

The electromagnetic coupling module may preferably be disposed on a joint of different radiation plates.

The radiation electrode may preferably be formed on an outer surface of the base material remote from the electromagnetic coupling module, for example.

The electromagnetic coupling module is preferably disposed inside the base material, for example.

Both or one of the wireless IC and the feed circuit substrate may preferably be covered with a protection film, for example.

The wireless IC is preferably a wireless IC chip made of a semiconductor, the feed circuit substrate has a recess on a first main surface thereof, and the wireless IC chip is disposed in the recess, for example.

The wireless IC may be disposed inside the feed circuit substrate, for example.

The feed circuit substrate may preferably be a multilayer substrate formed by laminating dielectric layers each having an electrode pattern formed thereon, for example.

In order to solve the above-mentioned problems, a wireless IC device manufacturing method according to another preferred embodiment of the present invention is configured as follows.

A wireless IC device manufacturing method includes the steps of: preparing an electromagnetic coupling module and a base material, the electromagnetic coupling module being formed by providing an wireless IC on a feed circuit substrate, the feed circuit substrate including an inductance element, and forming a plurality of radiation electrodes on at least one main surface of the base material using a conductive material; forming a cylindrical or bag-shaped packaging material by joining together a pair of edges of the base material at a joint, the joint being a vicinity of the edges of the base material; and affixing an electromagnetic coupling module to the joint of the base material, the electromagnetic coupling module being electromagnetically coupled to the radiation plates.

According to various preferred embodiments of the present invention, the following advantages are obtained.

Since the radiation electrode is preferably disposed on each of the opposed first and second surfaces of the electromagnetic coupling module including the wireless IC and the feed circuit substrate, the electromagnetic coupling module is protected by the radiation plate. Thus, the mechanical strength can be increased. Also, by adjusting the amount of coupling between the first and second surfaces of the electromagnetic coupling module and the radiation plate, it is possible to design radiation characteristics freely.

By disposing the resonant circuit inside the feed circuit substrate, the selectivity of the frequency is increased. Thus, the operating frequency of the wireless IC device can be roughly determined on the basis of the self-resonant frequency. Accordingly, it is possible to efficiently give or receive (transmit or receive) energy of a signal having a frequency used in an RFID system. Also, it is possible to set the resonant frequency to an optimum one in consideration of the shape or size of the radiator. Thus, it is possible to improve radiation characteristics of the wireless IC device.

By providing the matching circuit inside the feed circuit substrate, it is possible to efficiently give or receive (transmit or receive) energy of a signal having a frequency used in an RFID system.

By capacitively coupling the flat electrode to the radiation electrode near the main surface of the feed circuit substrate inside the feed circuit substrate, the radiation electrode and wireless IC can be disposed such that they are electrically insulated from each other. Thus, the wireless IC is prevented from being damaged electrostatically, that is, the wireless IC can increase electrostatic resistance thereof.

By disposing the electromagnetic coupling module on the joint of the ends of the radiation plate or the joint of the folded portion of the radiation plate, it is possible to dispose the electromagnetic coupling module on a joint of a sheet material that occurs when forming a packaging body using the sheet material. Thus, it is possible to mount the wireless IC device such that the wireless IC device is inconspicuous in terms of appearance.

By making the electromagnetic coupling module disposed on the joint detachable from the joint, the electromagnetic coupling module can be reused easily. Also, the electromagnetic coupling module can be replaced. By replacing the electromagnetic coupling module with another, a different ID can be provided.

By disposing the electromagnetic coupling module on the joint of the different radiation plates, the electromagnetic coupling module is covered with the base materials of the radiation plates. Thus, the electromagnetic coupling module can be protected and the mechanical strength or environmental resistance thereof can be increased.

By forming the radiation electrode on the outer surface (remote surface) of the base material remote from the electromagnetic coupling module, radiation characteristics can be improved and the distance between the electromagnetic coupling module and a reader/writer can be increased. Also, communication failures can be reduced.

By disposing the electromagnetic coupling module inside the base material, the mechanical strength or environmental resistance of the electromagnetic coupling module is increased.

By covering both or one of the wireless IC and the feed circuit substrate with the protection film, the mechanical strength or environmental resistance of the electromagnetic coupling module can be increased.

By forming the wireless IC using a wireless IC chip made of a semiconductor, forming the recess on the first main surface of the feed circuit substrate, and disposing the wireless IC chip in the recess, the electromagnetic coupling module can be downsized. Also, the portion where the electromagnetic coupling module and radiation plate are laminated is prevented from bulging.

By disposing the wireless IC inside the feed circuit substrate, a coupling electrode coupled to the radiation electrode can be formed also on the upper surface of the wireless IC. Thus, the coupling capacitance can be increased.

By forming the feed circuit substrate using a multilayer substrate formed by laminating dielectric layers each having an electrode pattern formed thereon, the electromagnetic coupling module can be downsized. Also, the portion where the electromagnetic coupling module and radiation plate are laminated is prevented from bulging.

According to the wireless IC device manufacturing method according to a preferred embodiment of the present invention, the multiple radiation electrodes are formed on at least one main surface of the base material using a conductive material. Therefore, the multiple radiation electrodes can be formed continuously on the base material. Also, a cylindrical or bag-shaped packaging material is formed by joining together a pair of edges of the base material at the joint, which is a vicinity of the edges. Thus, it is possible to easily form a cylindrical or bag-shaped packaging material. Also, since the electromagnetic coupling module electromagnetically coupled to the multiple radiation plates is affixed to the joint of the base material, it is possible to seal articles in the cylindrical or bag-shaped packaging material using a conventional method. Therefore, it is possible to manufacture articles inserted into a cylindrical or bag-shaped packaging body provided with a wireless IC device, without increasing the cost.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 10A, 10B and 10C include drawings showing a method for manufacturing a bag-shaped article provided with a wireless IC device according to a seventh preferred embodiment of the present invention.

DETAILED DESCRIPTION OF THE PREFERRED EMBODIMENTS

First Preferred Embodiment

A wireless IC device according to a first preferred embodiment will be described with reference to FIGS. 2 to 4.

Figure 1:
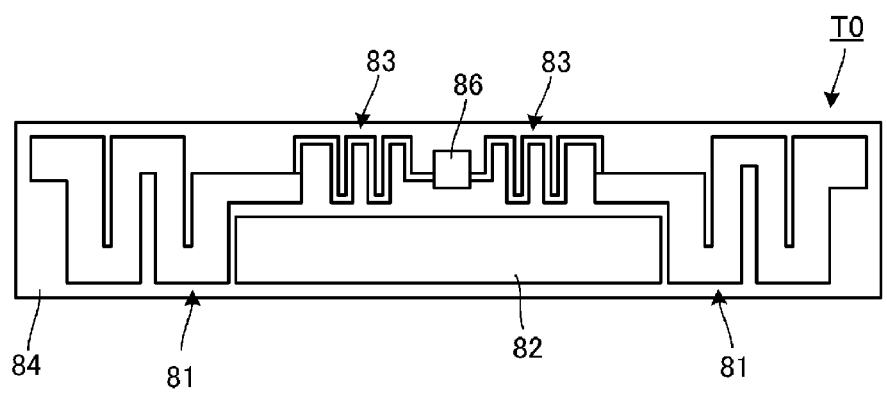
FIG. 1 is a diagram showing a configuration of a wireless IC device shown in Japanese Unexamined Patent Application Publication No. 2005-244778.
Figure 2:
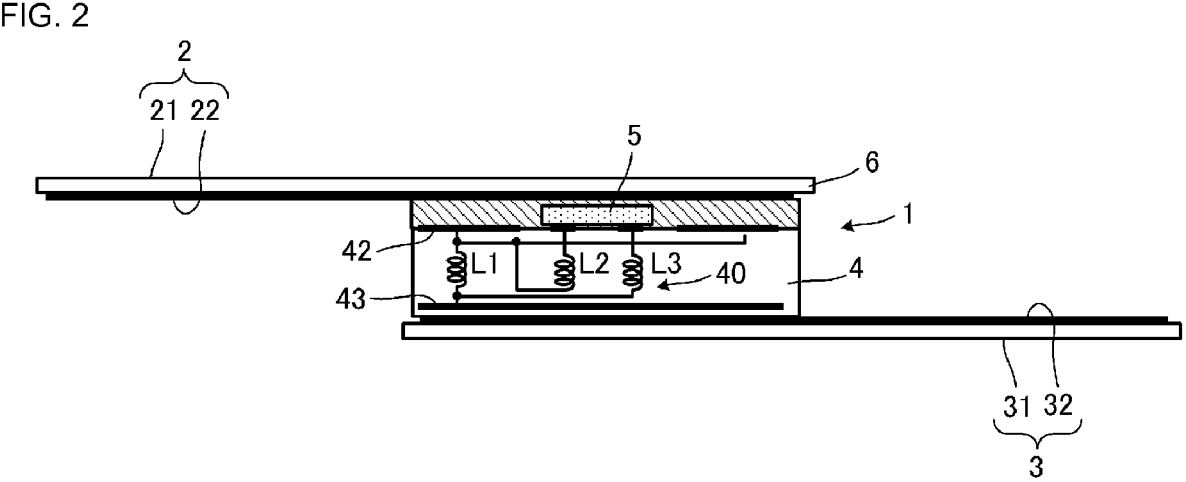
FIG. 2 is a sectional view of a major portion of a wireless IC device according to a first preferred embodiment of the present invention.

FIG. 2 is a sectional view of a major portion of the wireless IC device according to the first preferred embodiment of the present invention. In FIG. 2, reference numeral 2 is a radiation plate where a radiation electrode 22 is disposed on a base material 21, and reference numeral 3 is a radiation plate where a radiation electrode 32 is disposed on a base material 31. Reference numeral 1 is an electromagnetic coupling module, which includes a wireless IC chip 5 and a feed circuit substrate 4. The radiation electrodes 22 and 32 of the radiation plates 2 and 3 are disposed on opposed first and second surfaces, respectively, (top and bottom surfaces in the drawing) of the electromagnetic coupling module 1.

The feed circuit substrate 4 includes a resonant circuit 40 connected to the wireless IC chip 5 and an upper external coupling electrode 42 and a lower external coupling electrode 43 that are electrically connected to the resonant circuit 40 and are flat electrodes.

The feed circuit substrate 4 is preferably a multilayer substrate as will be described later and has the wireless IC chip 5 mounted on the top surface thereof. Also, a protection film 6 is preferably arranged around the wireless IC chip 5 and on the top surface thereof. The top surface of the protection film 6 is flat.

The protection film 6 may be provided in such a manner that it covers only the wireless IC chip 5 or in such a manner that it covers only the feed circuit substrate.

In a state shown in FIG. 2, the upper external coupling electrode 42 is capacitively coupled (electrically coupled) to the radiation electrode 22 of the radiation plate 2, and the lower external coupling electrode 43 is capacitively coupled (electrically coupled) to the radiation electrode 32 of the radiation plate 3.

By disposing the radiation electrodes 22 and 23 and the wireless IC chip 5 in such a manner that they are electrically insulated from each other, as described above, breakage of the wireless IC chip 5 due to static electricity passing through the radiation electrodes is prevented, that is, high electrostatic resistance is obtained.

Figure 3:
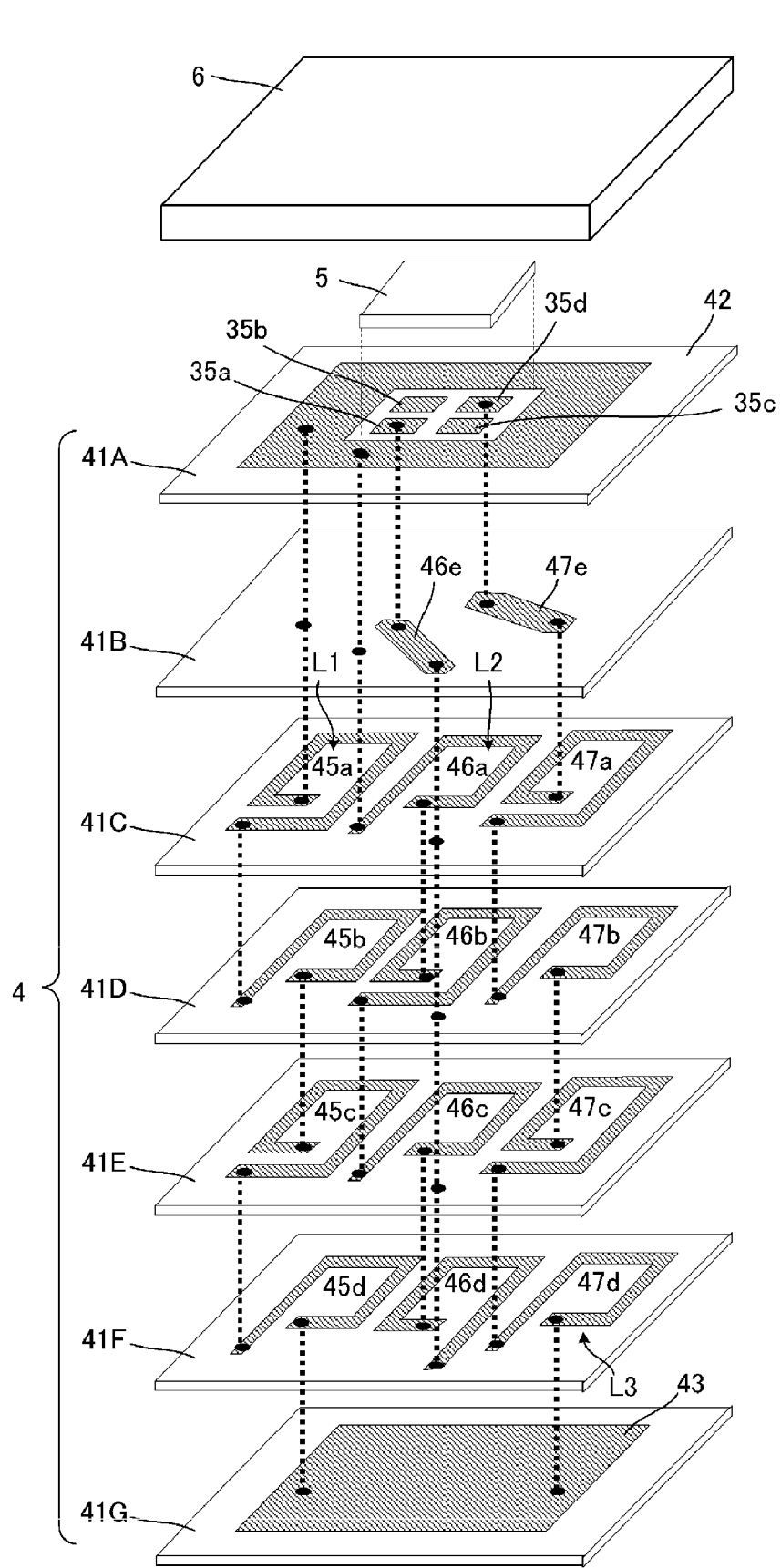
FIG. 3 is an exploded perspective view showing a configuration of an electromagnetic coupling module of the wireless IC device.

FIG. 3 is an exploded perspective view showing an internal configuration of the electromagnetic coupling module 1. The electromagnetic coupling module 1 includes the feed circuit substrate 4, preferably defined by a multilayer substrate, the wireless IC chip 5, and the protection film 6.

The feed circuit substrate 4 preferably is a multilayer substrate formed by laminating multiple dielectric layers each having an electrode pattern formed thereon. A dielectric layer 41A, which is the uppermost layer, has lands 35*a* to 35*d* for mounting a wireless IC chip and the upper external coupling electrode 42 formed thereon. A dielectric layer 41B has inductor electrodes 46*e* and 47*e* disposed thereon. A dielectric layer 41C has inductor electrodes 45*a*, 46*a* and 47*a* disposed thereon. A dielectric layer 41D has inductor electrodes 45*b*, 46*b* and 47*b* disposed thereon. A dielectric layer 41E has inductor electrodes 45*c*, 46*c* and 47*c* disposed thereon. A dielectric layer 41F has inductor electrodes 45*d*, 46*d* and 47*d* disposed thereon. A dielectric layer 41G has the lower external coupling electrode 43 disposed thereon. The electrodes on the dielectric layers are connected to one another through via holes, as shown in FIG. 3.

The above-mentioned inductor electrodes 45*a* to 45*d* define an inductor L1. The inductor electrodes 46*a* to 46*e* define an inductor L2. The inductor electrodes 47*a* to 47*e* define an inductor L3. The resonant circuit defined by the inductors L1, L2, and L3 is as shown in FIG. 2.

Elements formed in the feed circuit substrate 4 may be only inductance elements. In this case, the inductance elements and radiation electrode 22 and 23 may be directly coupled to each other or may be disposed in such a manner that they are insulated from each other. The inductance elements each have a function of matching the impedance of the wireless IC chip with those of the radiation electrodes.

The above-mentioned dielectric layers are each preferably made of dielectric ceramic. By laminating these dielectric layers and firing them integrally, a ceramic multilayer substrate is formed. Instead of ceramic, a resin material such as liquid crystal polymers may be used.

By using the feed circuit substrate 4 as described above, the impedance of the wireless IC chip 5 and those of the radiation electrodes 22 and 32 are matched and the resonant frequency is set to a desired value. The resonant frequency may be set in consideration of the shapes or sizes of the radiation electrodes 22 and 23. Thus, radiation characteristics of the wireless IC device can be improved.

The electromagnetic coupling module 1 that is shown in FIG. 2 and has the wireless IC chip 5 mounted on the feed circuit substrate 4 receives high-frequency signals (e.g., the UHF frequency band) emitted from a reader/writer (not shown) via the radiation electrodes 22 and 32, resonates the resonant circuit inside the feed circuit substrate 4, and provides only signals received in a predetermined frequency band to the wireless IC chip 5. On the other hand, the electromagnetic coupling module 1 extracts predetermined energy from the received signals. Using the energy as a driving source, the electromagnetic coupling module 1 matches information stored in the wireless IC chip 5 with a predetermined frequency in the resonant circuit, then transmits the resultant information to the radiation electrodes 22 and 32, and transmits and transfers the information from the radiation electrodes 22 and 32 to the reader/writer.

In the feed circuit substrate 4, the resonant frequency is determined in the resonant circuit defined by the inductor electrodes L1, L2, and L3 and stray capacitances thereof. The frequency of signals to be emitted from the radiation electrodes 22 and 32 are substantially determined on the basis of the self-resonant frequency of the resonant circuit.

Figure 4:
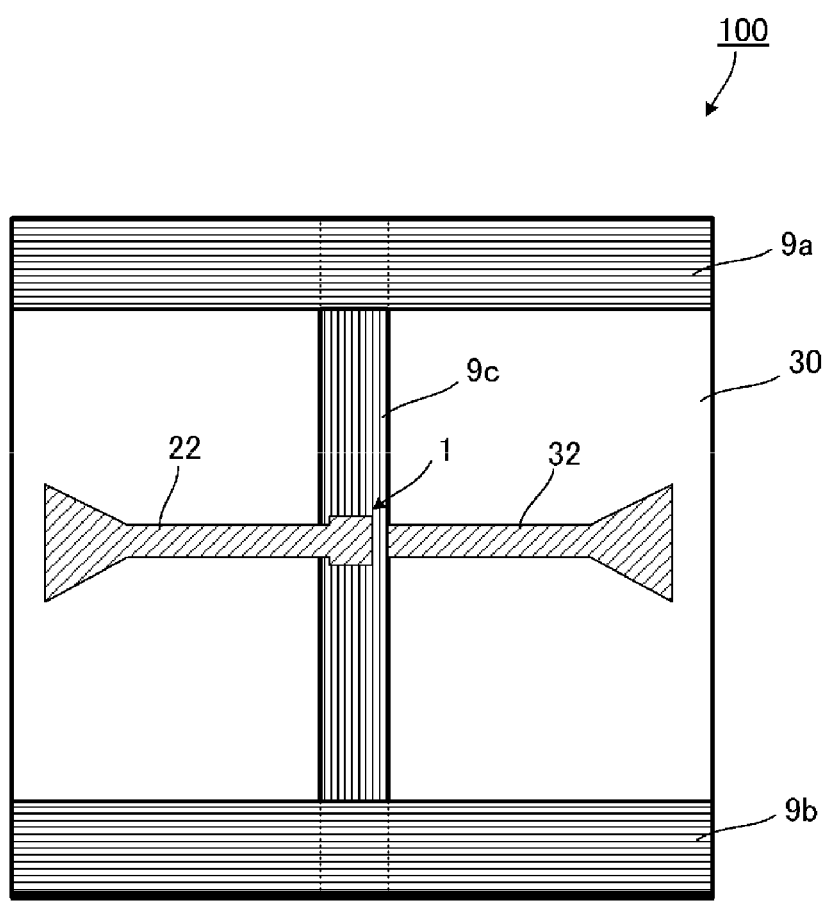
FIG. 4 is a drawing showing an example of a bag-shaped article provided with the wireless IC device and a pattern of a radiation electrode.

FIG. 4 is a plan view of a bag-shaped article including the above-mentioned wireless IC device. A bag-shaped article 100 is, for example, a bag of cookies or a bag of potato chips. A packaging body 30 is a bag-shaped body formed by joining together a sheet-shaped packaging material at joints (overlapped portions) 9*a*, 9*b*, and 9*c* using a bag-making machine. In this example, the electromagnetic coupling module 1 is disposed on the joint 9*c* for joining together the packaging body 30 along the long length direction thereof so as to form the packaging body 30 into a cylindrical or substantially cylindrical shape. The radiation electrodes 22 and 32 extending from the position to which the electromagnetic coupling module 1 is affixed are formed on the packaging body 30. The radiation electrodes 22 and 32 are formed by depositing a conductive material such as aluminum or affixing a conductor foil when manufacturing the packaging body 30. The electromagnetic coupling module may be provided on the joint 9a or 9b.

As shown in FIG. 4, if a wireless IC device is provided on a bag-shaped article made of a single packaging material, the base materials 21 and 31 of the radiation plates 2 and 3 shown in FIG. 2 correspond to the packaging body 30 shown in FIG. 4.

As seen, the joints 9a, 9b, and 9c necessarily occur on the bag-shaped article formed by forming the sheet-shaped packaging material into a cylinder shape and sealing the packaging material at predetermined intervals. Therefore, by forming the radiation electrodes and affixing the electromagnetic coupling module to these joints, it is possible to provide a wireless IC device without impairing the appearance (fine sight) of the bag-shaped article.

The electromagnetic coupling module 1 disposed on the joint 9c may be made detachable from a side of the joint 9c. Thus, the electromagnetic coupling module 1 can be easily reused. Also, by replacing the electromagnetic coupling module 1 with a different electromagnetic coupling module, it is possible to provide a different ID.

Second Preferred Embodiment

FIGS. 5A-5D include sectional views of major portions of some wireless IC devices according to a second preferred embodiment of the present invention.

Figure 5A:
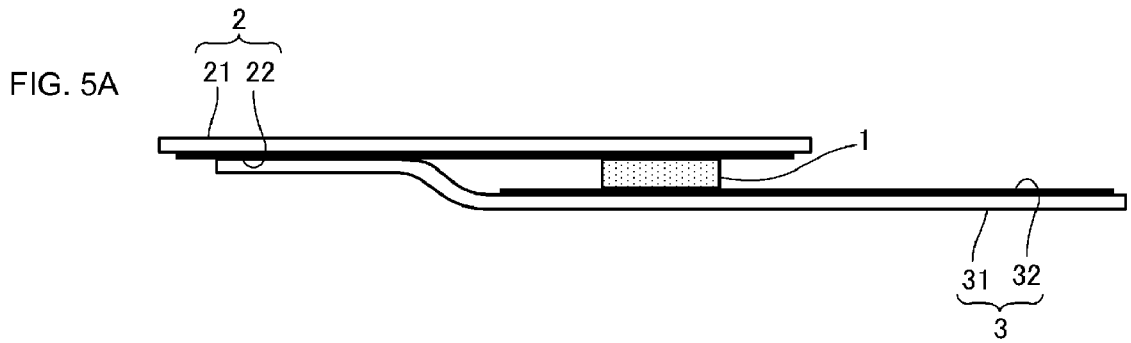
FIGS. 5A-5D include sectional views of major portions of some wireless IC devices according to a second preferred embodiment of the present invention.

In an example of FIG. 5A, when joining together the radiation plate 2 where the radiation electrode 22 is disposed on the base material 21 and the radiation plate 3 where the radiation electrode 32 is disposed on the base material 31, a pocket-shaped space is formed by joining together the radiation plate 2 and radiation plate 3 in such a manner that an end of the radiation plate 3 is farther inside than an end of the radiation plate 2 by a predetermined distance, and the electromagnetic coupling module 1 is inserted into the space and affixed to the radiation plates 2 and 3 such that the electromagnetic coupling module is interposed between the radiation plates.

Figure 5B:
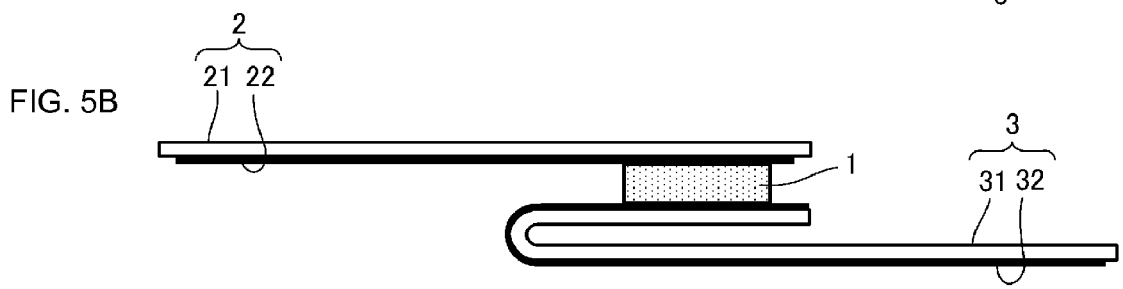

In an example of FIG. 5B, an end of the radiation plate 3 is folded back in such a manner that a surface of the radiation plate 2 having the radiation electrode 22 disposed thereon and a surface of the radiation plate 3 having the radiation electrode 32 disposed thereon are joined together, and the radiation plates are joined together on the folded portion.

The electromagnetic coupling module 1 is affixed to the position where the radiation plates 2 and 3 are joined together.

Figure 5C:
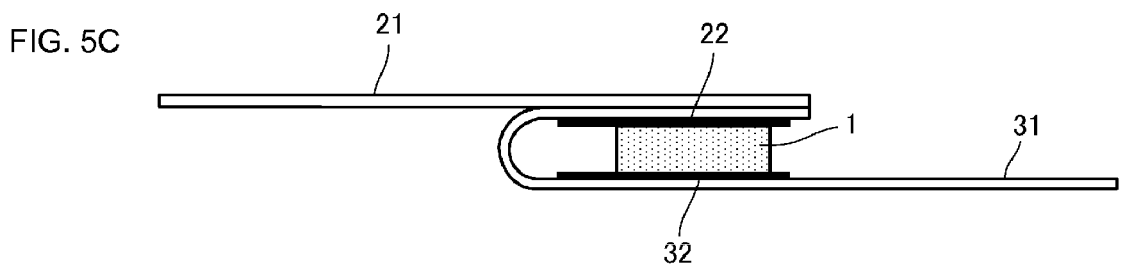

In an example of FIG. 5C, an end of the base material 31 is folded back and the end of the base material 31 and an end of the base material 21 are joined together. Also, the radiation electrodes 22 and 32 are disposed on the folded portion of the base material 31. The electromagnetic coupling module 1 is affixed to the folded portion. In this example, the radiation electrodes 22 and 32 extend in a direction perpendicular or substantially perpendicular to the surface of the paper.

Figure 5D:
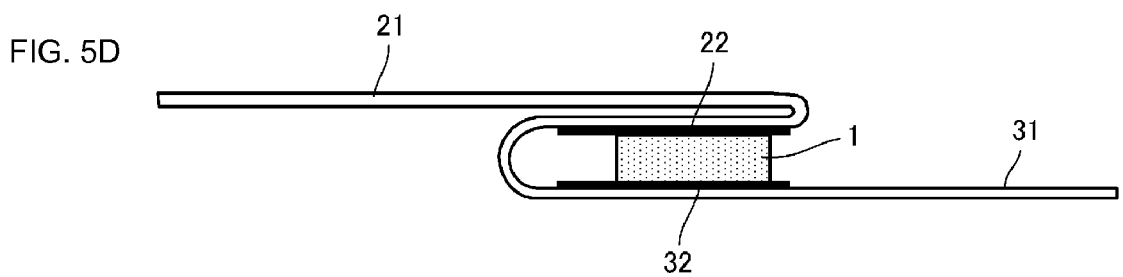

In an example of FIG. 5D, the base material 21 is folded back at a continuing portion thereof, and the radiation electrodes 22 and 32 are disposed on opposed surfaces of the folded portion. The electromagnetic coupling module 1 is affixed to the folded portion.

In this example, as in FIG. 5C, the radiation electrodes 22 and 32 extend in a direction perpendicular or substantially perpendicular to the surface of the paper.

In any of the examples of FIGS. 5A to 5C, the base materials 21 and 31 may be different sheet materials or may be ends of a single continuing base material as shown in FIG. 4.

Also, the radiation plates may be laminated films formed by multiple insulative base materials and conductive layers.

Third Preferred Embodiment

Figure 6:
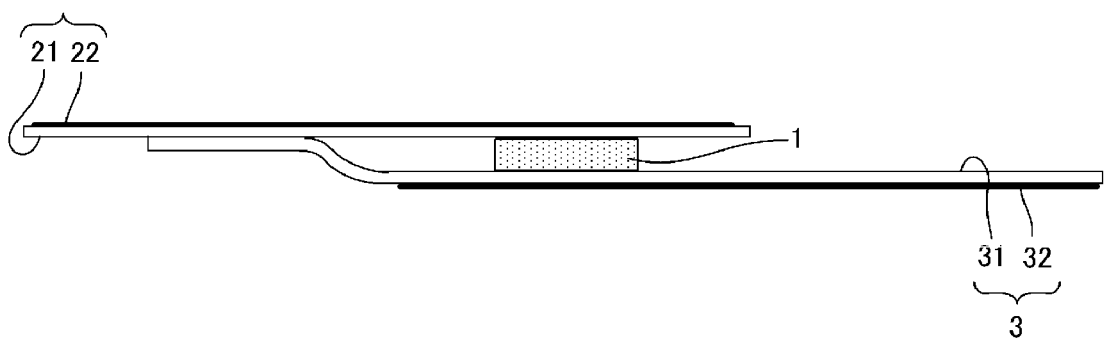
FIG. 6 is a sectional view of a major portion of a wireless IC device according to a third preferred embodiment of the present invention.

FIG. 6 is a sectional view of a major portion of a wireless IC device according to a third preferred embodiment. While the radiation electrodes 22 and 32 are disposed on the opposed inner surfaces of the base materials 21 and 31 in the example shown in FIG. 5A, the radiation electrodes 22 and 32 are disposed on the opposed outer surfaces of the base materials 21 and 31, that is, on the outer surfaces of the base materials remote from the electromagnetic coupling module 1 in an example of FIG. 6. Thus, radiation characteristics different from those of the structure shown in FIG. 5A can be obtained. For example, the communication distance between an RFID tag and a reader/writer can be increased.

Fourth Preferred Embodiment

Figure 7:
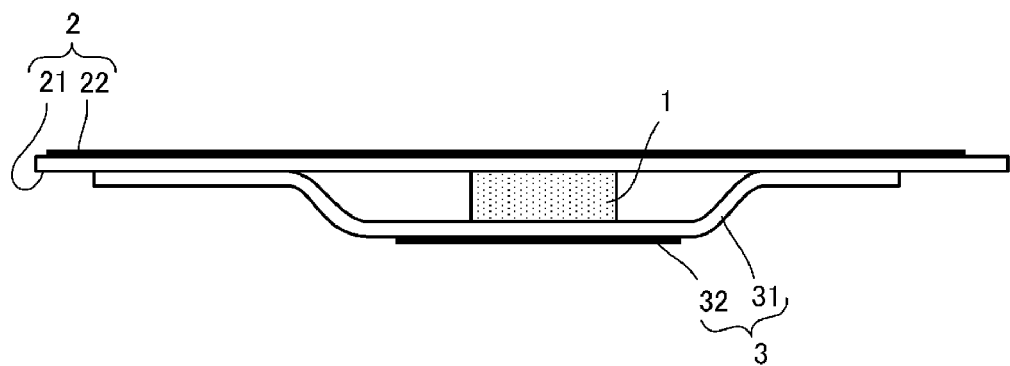
FIG. 7 is a sectional view of a major portion of a wireless IC device according to a fourth preferred embodiment of the present invention.

FIG. 7 is a sectional view of a major portion of a wireless IC device according to a fourth preferred embodiment. In this example, the radiation plate 3 where the radiation electrode 32 is disposed on the base material 31 is fused to predetermined positions on the radiation plate 2 where the radiation electrode 22 is disposed on the base material 21, and the electromagnetic coupling module 1 is affixed between the radiation plates 2 and 3. As seen in FIG. 7, the electromagnetic coupling module may be disposed between laminated different radiation plates instead of being disposed on the joint of ends of base materials.

Fifth Preferred Embodiment

Figure 8:
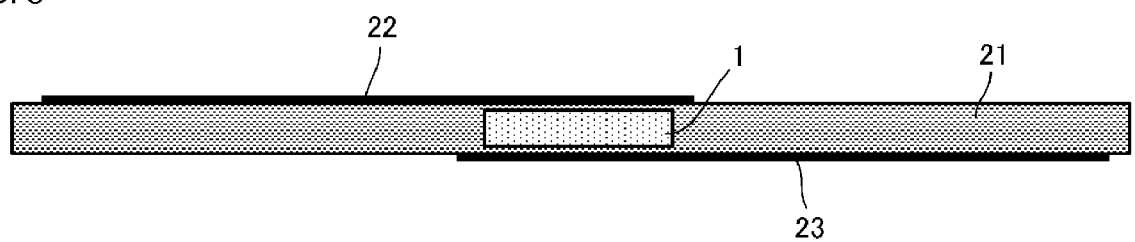
FIG. 8 is a sectional view of a major portion of a wireless IC device according to a fifth preferred embodiment of the present invention.

FIG. 8 is a sectional view of a major portion of a wireless IC device according to a fifth preferred embodiment. In this example, the radiation electrode 22 is formed on one surface of the base material 21 and the radiation electrode 23 is formed on the other surface thereof. The electromagnetic coupling module 1 is disposed in a position where the two radiation electrodes 22 and 32 are coupled inside the base material 21.

Specifically, the base material 21 is a base material, for example, made of paper. A recess into which the electromagnetic coupling module 1 is to be fixed is made on a predetermined location. The radiation electrode 23 made of an aluminum foil or a copper foil is affixed to the lower surface of the base material 21. The electromagnetic coupling module 1 is fixed into the recess. The radiation electrode 22 made of an aluminum foil or a copper foil is affixed to a position that is located on the upper surface of the base material 21 and covers the electromagnetic coupling module 1.

It is also possible to form an integral wireless IC device that can be handled as a single unit, by incorporating an electromagnetic coupling module into a base material and forming radiation electrodes on the front and back surfaces of the base material by printing or other suitable process.

Sixth Preferred Embodiment

Figure 9A:
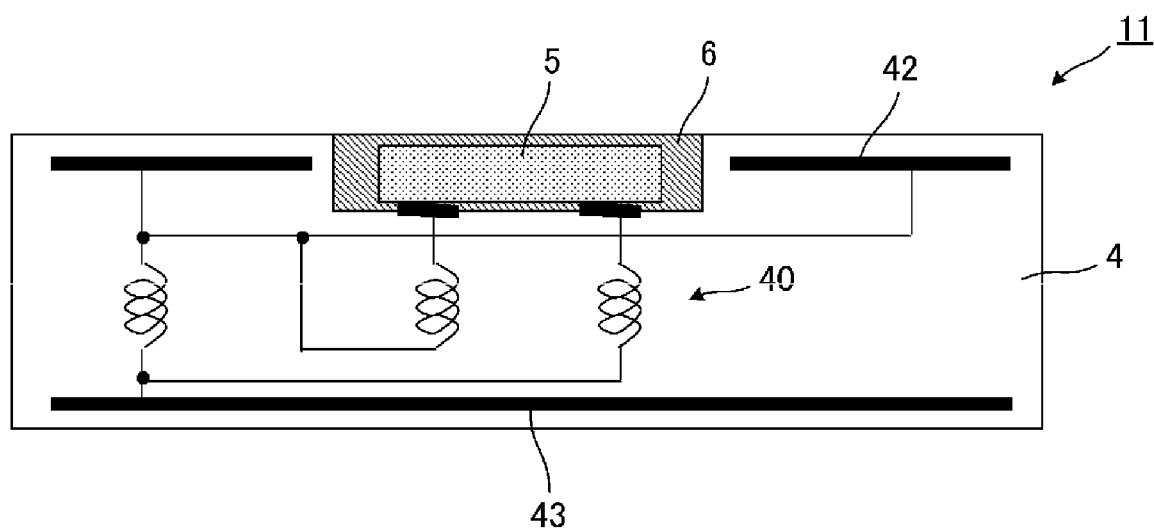
FIGS. 9A and 9B are sectional views showing a configuration of an electromagnetic coupling module used in a wireless IC device according to a sixth preferred embodiment of the present invention.
Figure 9B:
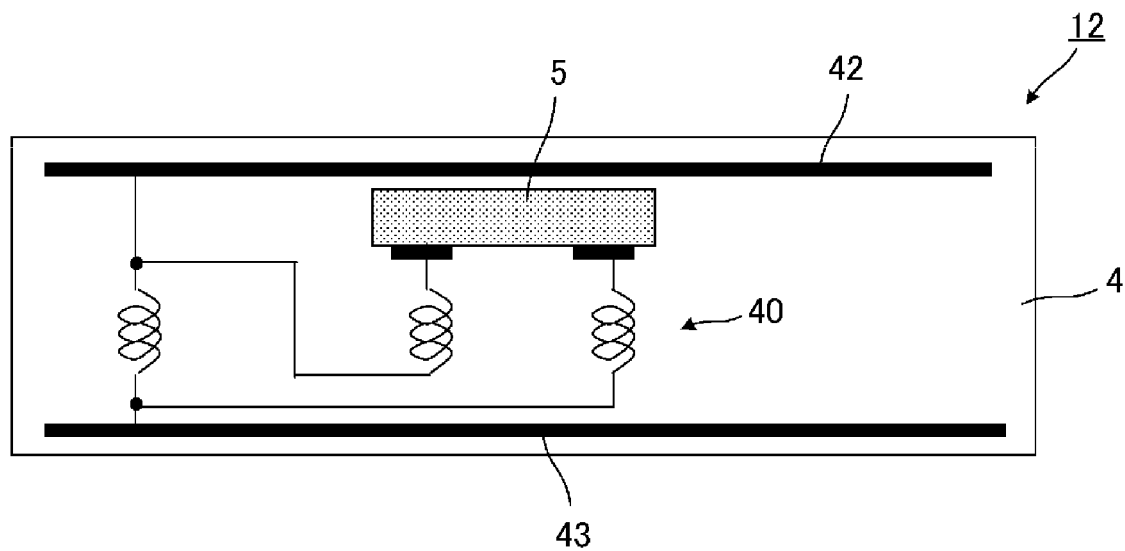

FIGS. 9A and 9B are sectional views of a configuration of an electromagnetic coupling module used in a wireless IC device according to a sixth preferred embodiment of the present invention.

In an example of FIG. 9A, a recess is formed on the upper surface of the feed circuit substrate 4, the wireless IC chip 5 is mounted into the recess, and the recess is covered with the protection film 6. An electromagnetic coupling module 11 is formed by providing the resonant circuit 40 as shown in FIG. 2 and the upper external coupling electrode 42 and second capacitor unit 43 inside the feed circuit substrate 4.

Also, in an example of FIG. 9B, an electromagnetic coupling module 12 is formed by providing the resonant circuit 40 as well as the upper external coupling electrode 42, second capacitor unit 43, and wireless IC chip 5 inside the feed circuit substrate 4.

As for the structure of FIG. 9B, the upper external coupling electrode 42 can be formed even on the upper surface of the wireless IC chip 5. Thus, the capacitance generated between the upper external coupling electrode 42 and the radiation electrode can be increased.

In any of the structures, the thickness dimension of the electromagnetic coupling module can be reduced. Thus, when disposing these electromagnetic coupling modules between radiation plates or inside a radiation plate, the positions where the electromagnetic coupling modules are mounted are prevented from bulging.

While the resonant circuit 40 is preferably disposed inside the feed circuit substrate 4 in the preferred embodiments shown above, a matching circuit for matching the impedance of the wireless IC chip with those of the radiation plates may be disposed therein.

Seventh Preferred Embodiment

The seventh preferred embodiment shows a method for manufacturing a bag-shaped article provided with the wireless IC device shown in FIG. 4. This manufacturing method will be described with reference to FIGS. 10A, 10B and 10C. Wireless IC device manufacturing steps are as follows.

First, an electromagnetic coupling module is formed by mounting a wireless IC device on a feed circuit substrate including a resonant circuit including inductance elements. The electromagnetic coupling module is disposed in such a manner that it can be provided continuously using a parts feeder.

Also, a base material 20 is disposed in such a manner that it can be provided continuously, the radiation electrodes 22 and 32 are formed on the base material 20 using a conductive material, and the base material 20 is made into a cylindrical packaging material by joining together a pair of edges (left and right edges of FIG. 10A) of the base material 20. Also, the cylindrical base material (packaging material) is sealed at predetermined intervals in a direction perpendicular or substantially perpendicular to the transfer direction of the base material, and the center of the sealed portion is perforated.

Contents such as potato chips are inserted into the bag-shaped portion, the bag-shaped portion is enclosed by sealing the opening thereof as shown in FIG. 10B, and the bagged portion is cut off at the above-mentioned perforation as shown in FIG. 10C.

The radiation electrodes 22 and 32 are previously formed when the base material 20 is in a state shown in FIG. 10A, or are formed in the stage when the base material 20 is formed into a cylindrical or substantially cylindrical shape. Also, with the base material 20 being cylindrical or bag-shaped, an electromagnetic coupling module to be electromagnetically coupled to the radiation electrodes 22 and 32 formed on the base material is affixed to the joint of the base material.

By performing the above-mentioned steps continuously, bag-shaped articles each provided with a wireless IC device are manufactured.

While a wireless IC chip cut off from a semiconductor wafer is preferably used as a wireless IC in the preferred embodiments shown above, the present invention is not limited to a wireless IC using a wireless IC chip. For example, it is possible to form an organic semiconductor circuit on a substrate so as to form a wireless IC.

While the wireless IC is directly connected to the electrodes on the feed circuit substrate in the preferred embodiments shown above, the circuit of the feed circuit substrate and the wireless IC may be coupled using electromagnetic coupling such as capacitive coupling or inductive coupling.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wireless IC device comprising:
a wireless IC;
a radiation plate including a base material and a radiation electrode disposed on the base material;
a feed circuit substrate including an external coupling electrode and an inductance element, the external coupling electrode being electromagnetically coupled to the radiation electrode, the inductance element being coupled to the wireless IC; and
an electromagnetic coupling module defined by at least the wireless IC and the feed circuit substrate; wherein
the radiation plate is disposed along each of opposed first and second main surfaces of the electromagnetic coupling module.

2. The wireless IC device according to claim 1, wherein the feed circuit substrate includes a resonant circuit.

3. The wireless IC device according to claim 1, wherein the feed circuit substrate includes a matching circuit.

4. The wireless IC device according to claim 1, wherein the external coupling electrode is a flat electrode capacitively coupled to the radiation electrode, and the external coupling electrode is disposed near a main surface of the feed circuit substrate inside the feed circuit substrate.

5. The wireless IC device according to claim 1, wherein the electromagnetic coupling module is disposed on one of a joint of ends of the radiation plate and a joint of a folded portion of the radiation plate.

6. The wireless IC device according to claim 5, wherein the electromagnetic coupling module disposed on the joint is detachable from the joint.

7. The wireless IC device according to claim 1, wherein the electromagnetic coupling module is disposed on a joint of the different radiation plates.

8. The wireless IC device according to claim 1, wherein the radiation electrode is disposed on an outer surface of the base material that is remote from the electromagnetic coupling module.

9. The wireless IC device according to claim 1, wherein the electromagnetic coupling module is disposed inside the base material of the radiation plate.

10. The wireless IC device according to claim 1, wherein one or both of the wireless IC and the feed circuit substrate are covered with a protection film.

11. The wireless IC device according to claim 1, wherein the wireless IC is a wireless IC chip made of a semiconductor, the feed circuit substrate has a recess on a first main surface thereof, and the wireless IC chip is disposed in the recess.

12. The wireless IC device according to claim 1, wherein the wireless IC chip is disposed inside the feed circuit substrate.

13. The wireless IC device according to claim 1, wherein the feed circuit substrate is a multilayer substrate including laminated dielectric layers each having an electrode pattern disposed thereon.

14. A wireless IC device manufacturing method comprising the steps of:

preparing an electromagnetic coupling module and a base material, the electromagnetic coupling module being formed by providing an wireless IC on a feed circuit substrate, the feed circuit substrate including an inductance element, and forming a plurality of radiation electrodes on at least one main surface of the base material using a conductive material;

forming a substantially cylindrical or bag-shaped packaging material by joining together the base material at a joint, the joint being defined by portions near a pair of edges of the base material; and affixing an electromagnetic coupling module to the joint of the base material, the electromagnetic coupling module being electromagnetically coupled to the radiation plates.

* * * * *